(12) United States Patent
Su et al.

(10) Patent No.: US 9,148,309 B2
(45) Date of Patent: Sep. 29, 2015

(54) APPARATUS AND METHOD FOR ESTIMATING CHANNEL EFFECTS

(71) Applicant: MStar Semiconductor, Inc., Hsinchu County (TW)

(72) Inventors: Chun-Chi Su, Hsinchu County (TW); Ching-Fu Lan, Hsinchu County (TW); Chun-Chieh Wang, Hsinchu County (TW); Tai-Lai Tung, Hsinchu County (TW); Tung-Sheng Lin, Hsinchu County (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 22 days.

(21) Appl. No.: 14/174,007

(22) Filed: Feb. 6, 2014

(65) Prior Publication Data

US 2014/0219403 A1    Aug. 7, 2014

(30) Foreign Application Priority Data

Feb. 7, 2013    (TW) ............................. 102104827 A

(51) Int. Cl.
*H04L 27/00* (2006.01)
*H04L 25/02* (2006.01)

(52) U.S. Cl.
CPC ........ *H04L 25/0204* (2013.01); *H04L 25/0232* (2013.01)

(58) Field of Classification Search
CPC ............ H04L 25/0204; H04L 25/0232; H04L 25/0234
See application file for complete search history.

(56) References Cited

U.S. PATENT DOCUMENTS

| 2006/0269016 A1* | 11/2006 | Long et al. ................... 375/340 |
| 2009/0207956 A1* | 8/2009 | Kimura et al. ................ 375/346 |
| 2010/0309383 A1* | 12/2010 | Matsumura et al. .......... 348/725 |
| 2013/0121392 A1* | 5/2013 | Thompson et al. ........... 375/227 |

FOREIGN PATENT DOCUMENTS

CN            101827057          9/2010

OTHER PUBLICATIONS

Taiwan Patent Office, "Office Action", Feb. 15, 2015.

\* cited by examiner

*Primary Examiner* — David B. Lugo
(74) *Attorney, Agent, or Firm* — WPAT, PC; Justin King

(57) ABSTRACT

An apparatus for estimating channel effects is provided. A receiving module receives first data and first reference information arriving in a first time period, second data and second reference data arriving in a second time period, and third data and third reference data arriving in a third time period. An estimation module estimates channel effects corresponding to the first and third data, and the first, second and third reference data, respectively. A coefficient calculation module performs a Wiener filter coefficient calculation on the channel effects corresponding to the first, second and third reference data to generate a set of time-domain interpolation coefficients. An interpolation module interpolates the channel effects corresponding to the first third data according to the set of time-domain interpolation coefficients to generate a channel effect corresponding to the second data.

10 Claims, 2 Drawing Sheets

APPARATUS AND METHOD FOR ESTIMATING CHANNEL EFFECTS

This application claims the benefit of Taiwan application Serial No. 102104827, filed Feb. 7, 2013, the subject matter of which is incorporated herein by reference.

BACKGROUND OF THE INVENTION

1. Field of the Invention

The invention relates in general to digital signal broadcasting technologies, and more particularly, to an apparatus and a method for estimating channel effects of Integrated Services Digital Broadcasting-Terrestrial (ISDB-T) signals.

2. Description of the Related Art

Developments of digital television broadcasting have gradually matured with progresses of communication technologies. Besides being transmitted by cables, digital television signals may also be transmitted in form of wireless signals via base stations or artificial satellites. Integrated Services Digital Broadcasting-Terrestrial (ISDB-T) is a prevalent standard adopted in the field of digital television broadcasting. However, during a transmission process, wireless signals are inevitably affected and interfered by transmission environments. Therefore, in order to correctly parse received data, an ISDB-T receiver needs to first evaluate corresponding channel effects and thus eliminate influences posed by the channel effects upon signal contents.

Each data frame in an ISDB-T signal includes 204 orthogonal frequency division multiplexing (OFDM) symbols, each of which includes contents bits carried by multiple subcarriers. FIG. 1 shows an example of a content configuration of an ISDB-T signal, with the horizontal axis representing the frequency and the vertical axis representing the symbol number (the greater the number, the later the transmission time). As shown in FIG. 1, subcarriers at frequency indices in multiples of 3 (e.g., 0, 3, 6, 9 . . . ) carry a scatter pilot (SP) signal at every other four symbols.

Original contents of the above SP signal are known to a receiver, and may thus serve as reference for the receiver to determine channel effects. For example, an ISDB-T receiver may first identify a frequency-domain channel effect $H_{(t=0,\,f=0)}$ of the SP signal having a time index of 0 and a frequency index of 0, and a frequency-domain channel effect $H_{(t=4,\,f=0)}$ of the SP signal having a time index of 4 and a frequency index of 0. With time-domain interpolation, the ISDB-T receiver determines frequency-domain channel effects $H_{(t=1,\,f=0)}$, $H_{(t=2,\,f=0)}$ and $H_{(t=3,\,f=0)}$ between $H_{(t=0,\,f=0)}$ and $H_{(t=0,\,f=0)}$. Similarly, the ISDB-T receiver may also obtain frequency-domain channel effects $H_{(t=2,\,f=3)}$, $H_{(t=3,\,f=3)}$ and $H_{(t=4,\,f=3)}$ between $H_{(t=1,\,f=3)}$ and $H_{(t=5,\,f=3)}$ through interpolation.

In general, the ISDB-T receiver determines time-domain interpolation coefficients according to the ratio of time intervals. For example, it is determined $H_{(t=1,\,f=0)} = H_{(t=0,\,f=0)} * 0.75 + H_{(t=4,\,f=0)} * 0.25$; that is, the time-domain interpolation coefficients corresponding to $H_{(t=1,\,f=0)}$ are determined to be 0.75 and 0.25. Similarly, $H_{(t=2,\,f=0)} = H_{(t=0,\,f=0)} * 0.5 + H_{(t=4,\,f=0)} * 0.5$, and $H_{(t=3,\,f=0)} = H_{(t=0,\,f=0)} * 0.25 + H_{(t=4,\,f=0)} * 0.75$. In a situation where channel effects rapidly change as time progresses (e.g., in a propagation environment containing Doppler effects), the above method for selecting time-domain interpolation coefficients is likely to result in incorrect interpolation results.

SUMMARY OF THE INVENTION

The invention is directed to an apparatus and a method for estimating channel effects. In the present invention, time-domain interpolation coefficients are dynamically determined by a Wiener filter coefficient calculation. Compared to the conventional solution that determines time-domain interpolation coefficients by a constant time interval, the apparatus and method for estimating channel effects of the present invention more capably reflect changes in the channel effects as time progresses.

According to an embodiment of the present invention, an apparatus for estimating channel effects is provided. The apparatus includes a reception module, an estimation module, a coefficient calculation module, and an interpolation module. The reception module receives first data and first reference data arriving in a first time period, second data and second reference data arriving in a second time period, and third data and third reference data arriving in a third time period. The first data, the second data and the third data are transmitted via a first sub-carrier. The first reference data, the second reference data and the third reference data are transmitted via a second sub-carrier. The estimation module estimates channel effects corresponding to the first data, the third data, the first reference data, the second reference data and the third reference data, respectively. The coefficient calculation module performs a Wiener filter coefficient calculation according to the channel effects corresponding to the first reference data, the second reference data and the third reference data to generate a set of time-domain interpolation coefficients. The interpolation module interpolates the channel effects respectively corresponding to the first data and the third data according to the set of time-domain interpolation coefficients to generate a channel effect corresponding to the second data.

According to another embodiment of the present invention, a method for estimating channel effects is provided. The method includes: receiving first data and first reference data arriving in a first time period, second data and second reference data arriving in a second time period, and third data and third reference data arriving in a third time period, wherein the first data, the second data and the third data are transmitted via a first sub-carrier, and the first reference data, the second reference data and the third reference data are transmitted via a second sub-carrier; estimating channel effects corresponding to the first data, the third data, the first reference data, the second reference data and the third reference data, respectively; performing a Wiener filter coefficient calculation according to the channel effects corresponding to the first reference data, the second reference data and the third reference data to generate a set of time-domain interpolation coefficients; and interpolating the channel effects respectively corresponding to the first data and the third data according to the set of time-domain interpolation coefficients to generate a channel effect corresponding to the second data.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
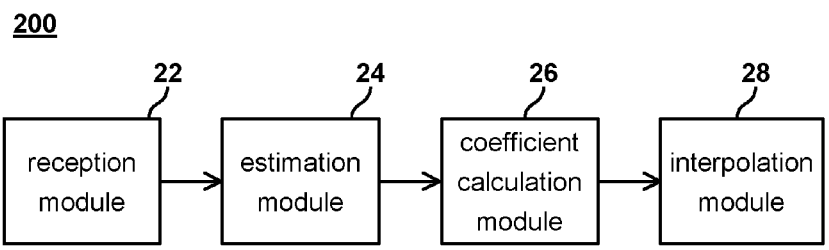
FIG. 2 is a block diagram of an apparatus for estimating channel effects according to an embodiment of the present invention.

FIG. 2 shows a block diagram of an apparatus for estimating channel effects according to an embodiment of the present invention. An apparatus 200 for estimating channel effects includes a reception module 22, an estimation module 24, a coefficient calculation module 26 and an interpolation module 28. In practice, the apparatus 200 for estimating channel effects may be integrated in various kinds of ISDB-T wireless reception systems, or may be an independent device. With the description below, one person skilled in the art can thoroughly understand that the application of the apparatus 200 for estimating channel effects is not limited to ISDB-T systems, but can be extended to all kinds of wireless reception systems that require time-domain interpolation coefficients for determining channel effects. In the embodiment below, an example of the apparatus 200 for estimating channel effects coordinating with an ISDB-T receiver is described.

Figure 1:
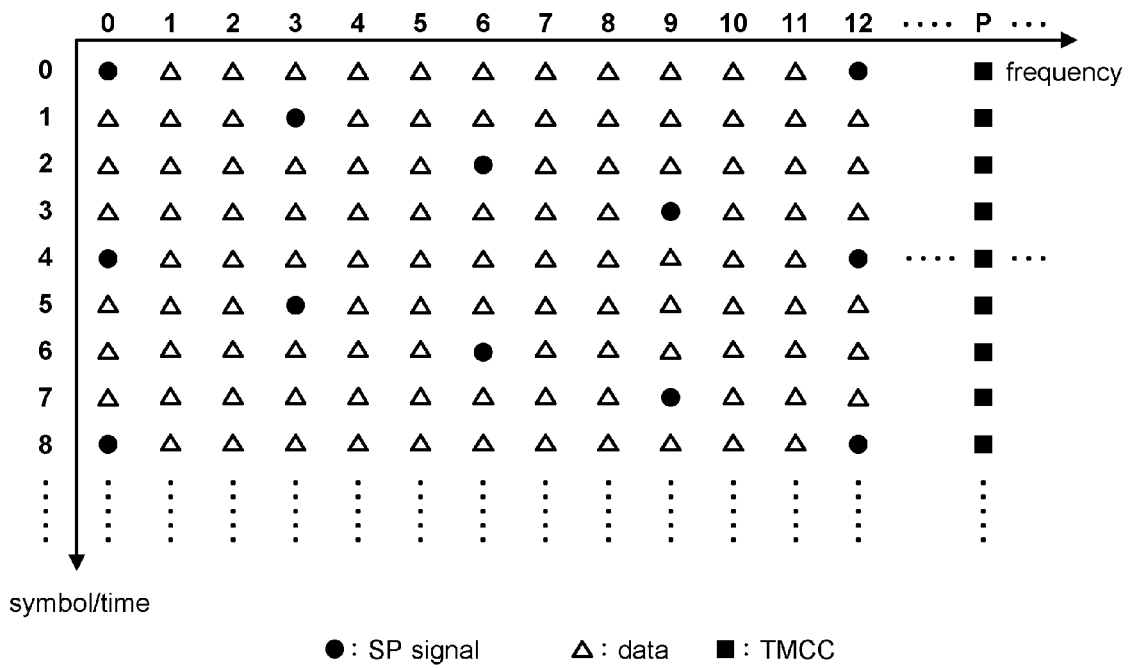
FIG. 1 is an example of a content configuration of an ISDB-T signal.

The reception module 22 receives and temporarily stores symbols sequentially arriving at an ISDB-T receiver. As shown in FIG. 1, contents of the symbols include data signals and SP signals carried by subcarriers in different frequencies, and transmission and multiplexing configuration control (TMCC) signals having a frequency index of P. The above signals are continuous in time and with symbol numbers; the smaller the number, the sooner the corresponding signal arrives the ISDB-T receiver. The TMCC signals are for transmitting information including modulation types, encoding rates, scrambling lengths and multiplexing schemes for the reference of the receiver. In practice, the amount of TMCC subcarriers may differ as the ISDB-T transmission mode changes. In the description below, it is assumed that P corresponds to a predetermined value of a particular TMCC subcarrier.

In the embodiment, the apparatus 200 for estimating channel effects utilizes the TMCC signals and the SP signals as reference for estimating unknown channel effects. More specifically, the apparatus 200 for estimating channel effects determines time-domain interpolation coefficients according to TMCC signals, and generates a channel effect of a data signal by interpolating the channel effects of SP signals according to the time-domain interpolation coefficients. Taking the frequency-domain channel effect $H_{(t=1, f=0)}$ having a time index of 1 and a frequency index of 0 for example, the apparatus 200 for estimating channel effects determines a set of time-domain interpolation coefficients by taking three TMCC signals respectively having time indices of 0, 1 and 4 and a frequency index of P as reference signals. The apparatus 200 then generates a channel effect $H_{(t=1, f=0)}$ by interpolating the known frequency-domain channel effects $H_{(t=0, f=0)}$ and $H_{(t=4, f=0)}$ of the SP signals. Operation details of the apparatus 200 for estimating channel effects are given below.

The estimation module 24 estimates the frequency-domain channel effects of the SP signals and the TMCC signals. As previously stated, the original contents of the SP signals are known to the receiver, and so the estimation module 24 may directly compare the known contents with the received contents to generate the frequency-domain channel effects. In contrast, the original contents of the TMCC signals are unknown, and thus the estimation module 24 demodulates and decodes the TMCC signals and then estimates the frequency-domain channel effects. Since an ISDB-T transmitter generates TMCC signals in form of differential binary phase shift keying (DPBSK), i.e., TMCC signals are represented by either "+1" or "−1", the frequency-domain channel effects that the estimation module 24 generates for the TMCC signals are highly reliable. It should be noted that, the method for determining the frequency-domain channel effects for known signals are known to one person skill in the art, and shall be omitted herein.

According to frequency-domain channel effects $H_{TMCC0}$, $H_{TMCC1}$ and $H_{TMCC4}$ that the estimation module 24 generates for the three TMCC signals respectively having time indices of 0, 1, and 4 and a frequency index of P, the coefficient calculation module 26 performs a Wiener filter coefficient calculation to generate a set of time-domain interpolation coefficients. The Wiener filter coefficient calculation is performed to minimize an error in an estimated result. In the embodiment, the coefficient calculation module 26 generates a first coefficient $W_1$ and a second coefficient $W_2$ in the set of time-domain interpolation coefficient according to the equation below:

$$\begin{bmatrix} W_1 \\ W_2 \end{bmatrix} = \begin{bmatrix} H_{TMCC0}H^*_{TMCC0} & H_{TMCC0}H^*_{TMCC4} \\ H_{TMCC4}H^*_{TMCC0} & H_{TMCC4}H^*_{TMCC4} \end{bmatrix}^{-1} \begin{bmatrix} H_{TMCC0}H^*_{TMCC1} \\ H_{TMCC4}H^*_{TMCC1} \end{bmatrix} \quad (1)$$

Equation (1) is a form of a Wiener-Hopf equation.

Next, the interpolation module 28 interpolates $H_{(t=0, f=0)}$ and $H_{(t=4, f=0)}$ generated by the estimation module 24 according to the set of time-domain interpolation coefficients to generate $H_{(t=1, f=0)}$. Such calculation can be represented as:

$$H_{(t=1, f=0)} = \begin{bmatrix} W_1 & W_2 \end{bmatrix} \cdot \begin{bmatrix} H_{(t=0, f=0)} \\ H_{(t=4, f=0)} \end{bmatrix} \quad (2)$$

In an embodiment, the coefficient calculation module 26 may further include a smoothing unit (not shown) configured to perform a smoothing procedure on a matrix below before the first coefficient $W_1$ and the second coefficient $W_2$ are generated:

$$\begin{bmatrix} H_{TMCC0}H^*_{TMCC0} & H_{TMCC0}H^*_{TMCC4} \\ H_{TMCC4}H^*_{TMCC0} & H_{TMCC4}H^*_{TMCC4} \end{bmatrix}^{-1} \quad (3)$$

The matrix is processed into a Teoplitz matrix to simplify calculation complications of equation (1). For example, the smoothing procedure may include calculating an average value of an upper-left element and a lower-right element, and replacing the two elements by the average value.

Assuming the matrix is in equation (3) is processed by a smoothing procedure into a Toeplitz matrix, the coefficient calculation module 26 may generate the first coefficient $W_1$ and the second coefficient $W_2$ by a Levinson recursion algorithm. It should be noted that, the method for simplifying a result of a Wiener-Hopf equation by the Levinson recursion algorithm is conventional, and shall be omitted herein.

As shown in FIG. 1, the data signal having a time index of 0 and a frequency index of 0 and the TMCC signal having a time index of 0 and a frequency index of P are included in the same symbol, and may be regarded as arriving at the ISDB-T receiver in a same time period. Similarly, the data signal having a time index of 1 and a frequency index of 0 and the TMCC signal having a time index of 1 and a frequency index of P arrive at the ISDB-T receiver in the same time period; the data signal having a time index of 4 and a frequency index of 0 and the TMCC signal having a time index of 4 and a frequency index of P arrive at the ISDB-T receiver in the same time period. As channel effect characteristics of the same time period may be quite similar, the apparatus 200 for estimating channel effects estimates the correlation of $H_{(t=1, f=0)}$ relative to $H_{(t=0, f=0)}$ and $H_{(t=4, f=0)}$ according to the correlation of $H_{TCMM1}$ relative to $H_{TMCC0}$ and $H_{TMCC4}$. Similarly, according to the channel effects that the estimation module 24 generates for the three TMCC signals respectively having time indices of 0, 2 and 4 and a frequency index of P, the coefficient calculation module 26 may perform a Wiener filter coefficient calculation to generate another set of time-domain interpolation coefficients, which are suitable for generating the frequency-domain channel effects for the data signal having a time index of 2 and a frequency index of 0. Compared to the prior art that determines interpolation coefficients by a constant time interval, the method applied to the apparatus 200 for estimating channel effects is in general much more precisely reflects changes in channel effects as time progresses.

It should be noted that, in the above embodiment, the example of the channel effects corresponding to known signals and for generating unknown channel effects is given to better understand the present invention, not limiting the present invention. For example, when the apparatus 200 for estimating channel effects has determined the channel effect for the data signal having a time index of 2 and a frequency index of 3, and the channel effect for the data signal having a time index of 4 and a frequency index of 3, a set of interpolation coefficients may also be further determined according to TMCC signals, so as to generate the channel effect of the data signal having a time index of 3 and a frequency index of 3.

Further, the reference signal according to which the interpolation coefficients are determined is not limited to TMCC signals. For example, in a Digital Video Broadcasting-Terrestrial (DVB-T) system, continual pilot (CP) signals included in the symbols may also serve as reference signals for the receiver to determine the interpolation coefficients.

Figure 3:
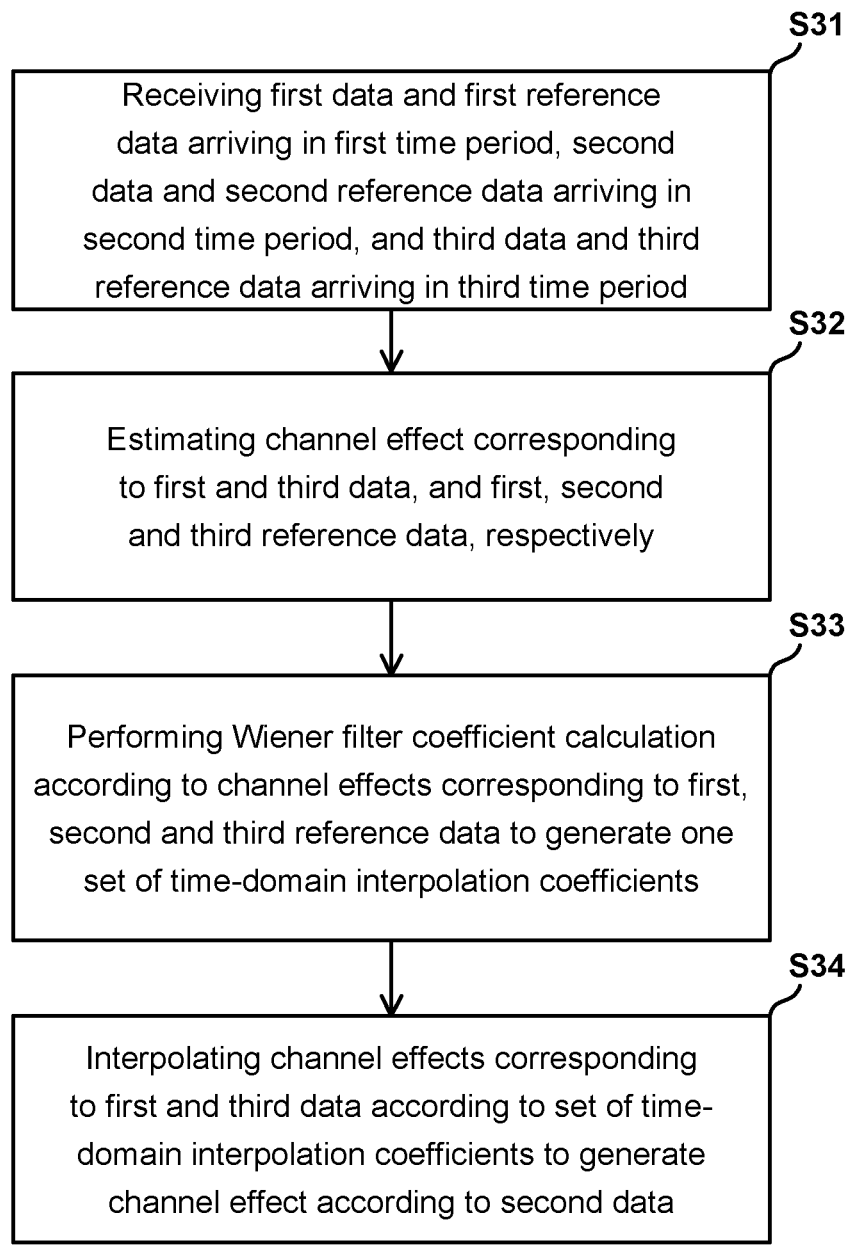
FIG. 3 is a method for estimating channel effects according to an embodiment of the present invention.

FIG. 3 shows a flowchart of method for estimating channel effects according to another embodiment of the present invention. Referring to FIG. 3, the method includes the following steps. In step S31, first data (e.g., the SP signal having a time index of 0 and frequency index of 0 in FIG. 1) and first reference data (e.g., the TMCC signal having a time index of 0 and a frequency index of P in FIG. 1) arriving in a first time period are received; second data (e.g., the SP signal having a time index of 1 and frequency index of 0 in FIG. 1) and second reference data (e.g., the TMCC signal having a time index of 1 and a frequency index of P in FIG. 1) arriving in a second time period are received; and third data (e.g., the SP signal having a time index of 4 and frequency index of 0 in FIG. 1) and third reference data (e.g., the TMCC signal having a time index of 4 and a frequency index of P in FIG. 1) arriving in a third time period are received. The first data, the second data and the third data are transmitted via a first sub-carrier. The first reference data, the second reference data and the third reference data are transmitted via a second sub-carrier. In step S32, a channel effect corresponding to the first data, the third data, the first reference data, the second reference data and the third reference data are estimated, respectively. In step S33, a Wiener filter coefficient calculation is performed according to the channel effects corresponding to the first reference data, the second reference data and the third reference data to generate a set of time-domain interpolation coefficients. In step S34, the channel effects respectively corresponding to the first data and the third data are interpolated according to the set of time-domain interpolation coefficients to generate a channel effect corresponding to the second data.

Operation details and variations in the description associated with the apparatus 200 for estimating channel effects (e.g., the method for simplifying the Wiener filter coefficient calculation) are applicable to the method for estimating channel effects in FIG. 4, and shall be omitted herein.

With the embodiments, an apparatus and a method for estimating channel effects are disclosed. In the present invention, time-domain interpolation coefficients are dynamically determined by a Wiener filter coefficient calculation. Compared to the prior art that determines interpolation coefficients by a constant time interval, the method and the apparatus for estimating channel effects of the present invention in large more realistically reflect changes in channel effects as time progresses.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for estimating channel effects, comprising:
   a receiver, configured to receive first data and first reference data arriving in a first time period, second data and second reference data arriving in a second time period, and third data and third reference data arriving in a third time period, wherein the first data, the second data and the third data are transmitted via a first sub-carrier, and the first reference data, the second reference data and the third reference data are transmitted via a second sub-carrier;
   an estimation circuit, configured to estimate channel effects corresponding to the first data, the third data, the first reference data, the second reference data and the third reference data, respectively;
   a coefficient calculation circuit, for performing a Wiener filter coefficient calculation according to the channel effects corresponding to the first reference data, the second reference data and the third reference data to generate a set of time-domain interpolation coefficients; and
   an interpolation circuit, configured to interpolate the channel effects respectively corresponding to the first data and the third data according to the set of time-domain interpolation coefficients to generate a channel effect corresponding to the second data,
   wherein the set of time-domain interpolation coefficients comprise a first coefficient W1 and a second coefficient W2, and the coefficient calculation circuit generates the first coefficient W1 and the second coefficient W2 according to an equation:

$$\begin{bmatrix} W_1 \\ W_2 \end{bmatrix} = \begin{bmatrix} T_1 T_1^* & T_1 T_3^* \\ T_3 T_1^* & T_3 T_3^* \end{bmatrix}^{-1} \begin{bmatrix} T_1 T_2^* \\ T_3 T_2^* \end{bmatrix},$$

where T1 represents the channel effect corresponding to the first reference data, T2 represents the channel effect corresponding to the second reference data, and T3 represents the channel effect corresponding to the third reference data.

2. The apparatus according to claim 1, wherein the interpolation-circuit generates the channel effect corresponding to the second data according to an equation:

$$H_2 = [\, W_1 \quad W_2\,] \cdot \begin{bmatrix} H_1 \\ H_3 \end{bmatrix},$$

where H1 represents the channel effect corresponding to the first data, and H2 represents the channel effect corresponding to the second data, and H3 represents the channel effect corresponding to the third data.

3. The apparatus according to claim 1, wherein the coefficient calculation circuit comprises a smoothing unit configured to perform a smoothing procedure on a matrix $$\begin{bmatrix} T_1 T_1^* & T_1 T_3^* \\ T_3 T_1^* & T_3 T_3^* \end{bmatrix}^{-1}$$

before generating the first coefficient and the second coefficient, so that said matrix becomes a Toeplitz matrix.

4. The apparatus according to claim 3, wherein the coefficient calculation circuit utilizing a Levinson recursion algorithm generates the first coefficient and the second coefficient.

5. The apparatus according to claim 1, wherein the first data, the second data, the third data, the first reference data, the second reference data and the third reference data are transmitted from an Integrated Services Digital Broadcasting-Terrestrial (ISDB-T) transmitter, the first data and the third data are respectively a scatter pilot (SP) signal, and the first reference data, the second reference data and the third reference data are included in a transmission and multiplexing configuration control (TMCC) signal.

6. A method for estimating channel effects, comprising:
a) receiving first data and first reference data arriving in a first time period, second data and second reference data arriving in a second time period, and third data and third reference data arriving in a third time period, wherein the first data, the second data and the third data are transmitted via a first sub-carrier, and the first reference data, the second reference data and the third reference data are transmitted via a second sub-carrier;
b) estimating channel effects corresponding to the first data, the third data, the first reference data, the second reference data and the third reference data, respectively;
c) performing a Wiener filter coefficient calculation according to the channel effects corresponding to the first reference data, the second reference data and the third reference data to generate a set of time-domain interpolation coefficients; and
d) interpolating the channel effects respectively corresponding to the first data and the third data according to the set of time-domain interpolation coefficients to generate a channel effect corresponding to the second data,
wherein the set of time-domain interpolation coefficients comprise a first coefficient W1 and a second coefficient W2, and step (c) generates the first coefficient W1 and the second coefficient W2 according to an equation:

$$\begin{bmatrix} W_1 \\ W_2 \end{bmatrix} = \begin{bmatrix} T_1 T_1^* & T_1 T_3^* \\ T_3 T_1^* & T_3 T_3^* \end{bmatrix}^{-1} \begin{bmatrix} T_1 T_2^* \\ T_3 T_2^* \end{bmatrix},$$

where T1 represents the channel effect corresponding to the first reference data, T2 represents the channel effect corresponding to the second reference data, and T3 represents the channel effect corresponding to the third reference data.

7. The method according to claim 6, wherein step (d) generates the channel effect corresponding to the second data according to an equation:

$$H_2 = [\, W_1 \quad W_2\,] \cdot \begin{bmatrix} H_1 \\ H_3 \end{bmatrix},$$

where H1 represents the channel effect corresponding to the first data, and H2 represents the channel effect corresponding to the second data, and H3 represents the channel effect corresponding to the third data.

8. The method according to claim 6, wherein step (c) comprises performing a smoothing procedure on a matrix $$\begin{bmatrix} T_1 T_1^* & T_1 T_3^* \\ T_3 T_1^* & T_3 T_3^* \end{bmatrix}^{-1}$$

before generating the first coefficient and the second coefficient, so that said matrix becomes a Toeplitz matrix.

9. The method according to claim 8, wherein step (c) comprises generating the first coefficient and the second coefficient by a Levinson recursion algorithm.

10. The method according to claim 6, wherein the first data, the second data, the third data, the first reference data, the second reference data and the third reference data are transmitted from an Integrated Services Digital Broadcasting-Terrestrial (ISDB-T) transmitter, the first data and the third data are respectively a scatter pilot (SP) signal, and the first reference data, the second reference data and the third reference data are included in a transmission and multiplexing configuration control (TMCC) signal.

* * * * *